Jan. 5, 1943.　　　　J. H. FRAKES　　　　2,307,499
INSULATOR TESTING
Filed April 11, 1941
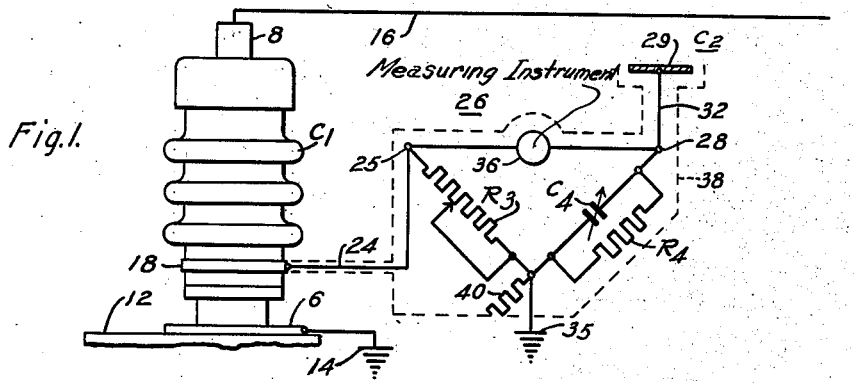
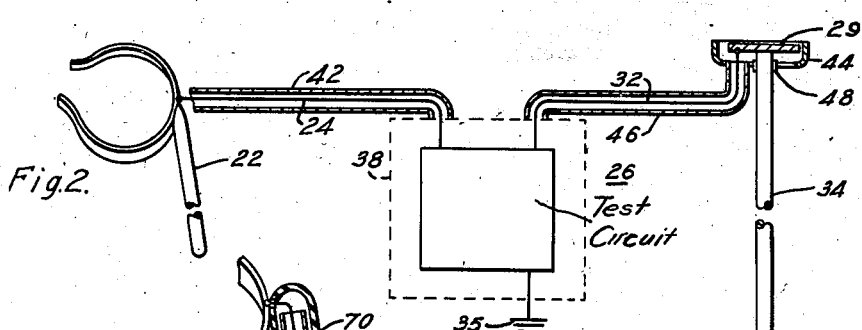
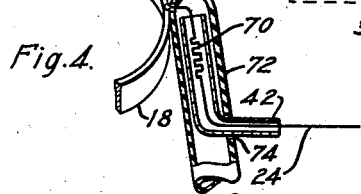
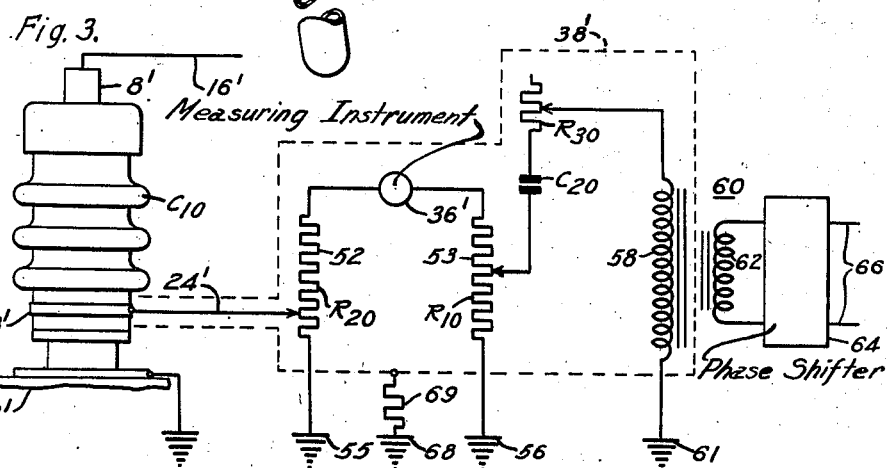
WITNESSES:
INVENTOR
James H. Frakes.
ATTORNEY Patented Jan. 5, 1943

2,307,499

UNITED STATES PATENT OFFICE 2,307,499

INSULATOR TESTING

James H. Frakes, Edgewood, Pa., assignor to Westinghouse Electric & Manufacturing Company, East Pittsburgh, Pa., a corporation of Pennsylvania Application April 11, 1941, Serial No. 388,081

6 Claims. (Cl. 175—183)

The present invention relates to insulator testing, and it has particular relation to equipment for making dielectric loss tests on insulators when in operating condition in the field.

While equipment for testing insulating qualities of insulators, such as high tension bushings, in the field has been available for some years, this prior art equipment is subject to several disadvantages. One of the most important of these is that it is necessary to disconnect the insulator and remove the apparatus from service in order to make the tests.

According to the present invention, these insulators may be tested while in actual service condition without the expense and trouble of removing the apparatus from service. In the case of high tension bushings, for example, I attach a metallic band to the casing at a point spaced from the grounded portion thereof and connect this band to an electrical test set, which is preferably of the portable electric bridge type. This test circuit is so associated with the insulator that the high tension conductor, which is energizing the apparatus served by the insulator, is itself used to furnish either part or all of the test potential. The invention may equally well be applied to a closed bridge circuit, such as the Schering bridge, or to an open junction bridge circuit which may be of the well-known Atkinson bridge type.

It is, accordingly, an object of the invention to provide a novel and improved device for testing electrical insulators when in operating position in the field.

It is another object of the invention to provide a device for measuring the power factor of electrical insulators when in installed position supporting an energized electrical conductor.

A further object of the invention is to provide test equipment including a conducting member which may be brought into contact with an insulating bushing when in operating condition to measure the power factor thereof.

Other objects and advantages of the invention will appear from the following detailed description when read in conjunction with the accompanying drawing, in which:

Figure 1 is a wiring diagram of testing equipment constructed in accordance with the invention and applied to a high potential insulating bushing;

Fig. 2 is a schematic diagram of the apparatus of Fig. 1;

Fig. 3 is a wiring diagram similar to that of Fig. 1 of a modification of the invention; and Fig. 4 is a perspective view, with parts broken away, of the clamping band employed with the invention.

Referring to Figs. 1 and 2 of the drawing, a high tension insulating bushing $C_1$ having a clamping flange 6 and high tension terminal 8 is shown assembled on a tank 12. This tank is adapted to contain electrical equipment, such as a transformer or circuit breaker, and is grounded as indicated at 14. A high tension conductor 16 is connected to the terminal 8 of the bushing to energize the equipment within the tank in a usual manner.

A metallic clamping band 18, which is preferably of relatively flexible material, is secured to the end of a stick 22 of insulating material. This band 18 is detachably secured to the casing of the insulating bushing $C_1$ at a point spaced from the grounded metallic portion 6 thereof, and is connected by means of a conductor 24 to a junction 25 of the testing bridge designated generally at 26.

To the opposite junction 28 of the testing bridge is connected a metallic condenser member 29 by means of a conductor 32. This condenser member 29 is preferably in the form of a plate of conducting material disposed adjacent to the high tension conductor 16 to form a condenser therewith. The condenser member is preferably attached to the upper end of a standard 34 of insulating material, and it is preferred to make this standard adjustable in height so that it may conveniently be located in the desired relationship to the high tension conductor in different electrical installations.

The testing circuit shown in Figs. 1 and 2 is of the Schering-bridge type which is described more fully in Patent No. 1,166,159, issued December 28, 1915, to Thomas, and Patent No. 2,130,865, issued September 20, 1938, to T. R. Watts and myself. As shown, a variable resistance $R_3$ is connected to the junction 25 and grounded as indicated at 35, while a circuit including a variable condenser $C_4$ in parallel with a resistor $R_4$ is connected between the junction 28 and the grounded junction 35 to form another arm of the bridge circuit. A measuring instrument 36 is connected between the junctions 25 and 28 to indicate the condition of balance of the bridge.

As will be evident from the foregoing description, the portion of the condenser $C_1$ between the high tension terminal 8 and the metallic band 18 is connected to form a third arm of the bridge circuit, while the condenser formed by the cooperation of the plate 29 and the conductor 16 will function as the fourth arm of the circuit and result in a Schering-bridge arrangement of the type indicated.

The test set is preferably provided with a guard circuit designated at 38 which may be of a type well known in the art. A resistor 40 is connected between this guard circuit and the grounded bridge junction 35, in order to maintain the guard circuit at a potential of higher than ground. In addition, a metallic shield 42 is preferably provided for the conductor 24, and may be attached to the guard circuit 38 in the manner shown. In a similar manner, a metallic guard member 44 is disposed around the bottoms and sides of the condenser plate 29 and connected to a shielding member 46 which encloses the conductor 32, and is maintained at the potential of the guard circuit 38. This shield 44 may be secured to the standard 34 by means of a bushing 48 or some other suitable means and, in turn, furnishes support to the conductor 32 and shield 46. It will be understood that these two shielded leads 24 and 32 may comprise metal covered conductors of a type well known in the art, and may include insulating covers on the outside of the respective shields.

In Fig. 3, a circuit is shown in which an open junction bridge circuit is employed with the present invention. This bridge circuit may be of the well-known Atkinson type which is described in greater detail in an article entitled, "A high tension bridge for measurement of dielectric losses in cables," appearing in the Electric Journal for February, 1925, starting at page 58.

In this modification, a condenser bushing $C_{10}$ of the same construction previously described is shown in operating position on an apparatus tank indicated at 12'. The bushing likewise includes a high tension terminal 8' which is connected to the high tension conductor 16'.

The bridge circuit itself comprises a pair of variable resistance arms 52 and 53, one terminal of each of which is connected to ground at 55 and 56, respectively, while the other terminals are connected in series with a milliammeter 36'. The adjustable point on the resistor 52 is connected by means of a conductor 24' to a metallic band 18' disposed about the insulating bushing, and the portion of this resistor between the conductor and ground is designated at $R_{20}$. In like manner, the adjustable point on the resistor 53 is connected to a terminal of a standard condenser $C_{20}$, and the lower portion of this resistor is designated at $R_{10}$. The other terminal of the standard condenser $C_{20}$ is connected in series with a variable resistor $R_{30}$, and the secondary winding 58 of a transformer 60. The other terminal of the secondary winding 58 is grounded, as indicated at 61.

The primary winding 62 of the transformer 60 is connected through a phase-shifter 64 to a potential source 66 which may be of the usual power supply of 115 volts. While, as will appear from the drawing, the arms of the bridge including the portion of the condenser $C_{10}$ and the resistor $R_{20}$ are energized at a high voltage from the main conductor 16', the transformer 60 is provided to energize the portion of the bridge circuit including the resistors $R_{10}$ and $R_{30}$ and the condenser $C_{20}$. A phase-shifter 64, which may be of the usual type, is provided for keeping this auxiliary testing voltage in proper phase relationship with the main testing voltage, as is required to obtain a balance with the Atkinson-type bridge. This bridge is preferably provided with a guard circuit 38' which may be similar to that described with respect to Fig. 1, and is connected to ground at 68 through a resistor 69.

When the bridge circuit of Fig. 1 is in balanced condition, the power factor of the portion of the bushing connected therein may be determined from the equations given in the aforementioned patents. In the particular circuit shown, for example, the following relationship exists between the power factor angle and the circuit impedance values:

$$\cot \theta = \omega R_4 C_4$$

Since the cotangent of $\theta$ is substantially equal to the cosine for the small angles which are encountered in this work, this may be taken as the value of the power factor of the device.

When the circuit of Fig. 3 is in balanced condition, the power factor of the bushing between the points connected in the circuit may be found by the calculations described in the previously mentioned Atkinson article. With the particular circuit shown, however, the value of this power factor is given by the following equation:

$$P.F. = \omega C_{20}(R_{30} + R_{10})$$

where the reactance of $C_{20}$ is relatively large as compared to the value of $R_{20}$.

For the sake of additional safety to the operator, it may be desirable to provide a relatively high resistor in the circuit of the cable of the conductors 24 and 24'. Such a resistor is indicated at 70 in Fig. 4, wherein a modified structure of the stick for supporting the clamping ring is shown. Thus, the stick 72 is preferably of hollow construction and is made of insulating material. The clamping ring 18 is secured to the upper end thereof by some suitable means, and conductor 24 extends from this clamping ring into the stick 72 as shown. An aperture 74 is provided in the stick a selected distance below the upper end thereof, and the conductor 24 and the shielding member 42 extend through this aperture and away from the stick. As is shown, the resistor 70 is preferably disposed in the part of the conductor which is within the stick. If this high resistor is used in the manner described, it will, of course, become necessary to take it into account in computing the power factor of the bushing when the condition of balance is reached. The specific means for computing the power factor in this case will not be described, since it will readily appear to those skilled in the art.

From the foregoing, it will appear that the present invention provides equipment with which the power factor of high tension insulators may be readily obtained without the expense and trouble of removing the apparatus supplied thereby from service. The operator need only slip the flexible metallic band about the insulator while the insulator and the apparatus are in operation without making any disconnections. Since the various bridge circuits may be of the portable type which is known in the prior art, no difficulty need be encountered in transporting it. It will also appear that by employing a recording instrument arrangement and leaving the band 18 on the apparatus over a period of time of normal operation, a continuous record of the dielectric loss of the insulator may be obtained.

Although the entire insulator is not connected in the bridge circuit with this arrangement, a major portion of it is, and the values of the power factor for this portion have been found to approach very closely to the actual power factor of the complete insulator. The very slight difference which may exist at times is not great enough to impair the value of the test results.

Since various modifications in the apparatus shown and described will appear to those skilled in the art, it is intended that the invention shall be limited only by the appended claims interpreted in view of the prior art.

I claim as my invention:

1. In a device for measuring the power factor of a grounded electrical insulator supporting a high tension conductor while in operating condition, a conducting member engaging said insulator at a location spaced from the grounded portion thereof, a pair of adjustable impedance members connected to form two arms of a bridge circuit, a lead from a terminal of one of said impedances to said conducting member to form another arm of said bridge circuit, a member associated with said high tension conductor to form a condenser, means connecting said condenser member to a terminal of the other of said impedances to complete the bridge circuit, and an electrical instrument connected between the unconnected terminals of said pair of impedances.

2. In a device for measuring the power factor of an insulating bushing having a grounded supporting member when in operating condition with a high tension conductor connected thereto, an insulated handle, a metallic band secured to said handle for detachably engaging said bushing at a position spaced from said grounded member, a pair of adjustable impedances connected in series to form two arms of a bridge circuit, a lead from the unconnected terminal of a first of said impedances to said metallic band, a member associated with said high tension conductor to form a condenser, means connecting said condenser member to a terminal of the second said impedance to complete the bridge circuit, and an electrical instrument connected between the unconnected terminals of said variable impedances.

3. In a device for measuring the insulating properties of an insulating bushing having a grounded supporting member and a high tension lead extending therethrough while in operating condition with said high tension lead energized, a metallic member for engaging said bushing at a position spaced from the grounded portion thereof, an open corner bridge-type testing circuit, means for connecting said metallic member to said testing circuit to place it in an arm of said bridge, and means for supplying another portion of said testing circuit with an alternating voltage, said bridge circuit including an electrical instrument for indicating the condition of balance.

4. In a device for measuring the insulating properties of an insulating bushing having a grounded supporting member and a high tension lead extending therethrough while in operating condition with said high tension lead energized, a metallic band for engaging said bushing at a point adjacent to but spaced from the grounded member, a bridge type testing circuit designed to provide measurements indicative of power factor, and means connecting said testing circuit to said metallic band to measure the power factor of said bushing between said lead and said band with at least a portion of the testing energy being supplied from said high tension lead.

5. In a device for measuring the power factor of an insulating bushing having a grounded supporting member and a conducting lead extending therethrough, while said bushing is in operating condition with its lead connected to a high tension conductor, a metallic band for engaging said bushing at a position spaced from said grounded member, a member for disposition in spaced relation to said conductor to form a capacitance therewith, a pair of impedance means forming adjacent arms of a bridge circuit, means electrically connecting said metallic band and said capacitance member to the unconnected ends of said impedance means to form a closed bridge circuit, and a measuring instrument connected across said bridge circuit to indicate its condition of balance.

6. In a device for measuring the power factor of an insulating bushing having a grounded supporting member and a conducting lead extending therethrough while said bushing is in operating condition with its lead connected to a high tension distribution line, a metallic band for engaging said bushing at a point adjacent to but spaced from the grounded member, a member for disposition in closely spaced relation to said line to form a capacitance therewith, a pair of adjustable impedances connected in series to form two arms of a bridge circuit, a conducting lead interconnecting the unconnected terminal of a first of said impedances to said metallic band, a conducting lead interconnecting said capacitance member with the unconnected terminal of the second impedance member to complete the bridge circuit, and an electrical measuring instrument connected between the outside terminals of said variable impedances.

JAMES H. FRAKES.